United States Patent [19]

Mitzkat et al.

[11] Patent Number: 5,592,748
[45] Date of Patent: Jan. 14, 1997

[54] HEAT TREATMENT OF SOLID CATALYST OR ADSORBENT PARTICLES IN THE PRESENCE OF FLUID IN A VIBRATING HELICAL COIL

[75] Inventors: Martin Mitzkat; Pierre Dufresne, both of Valence; François Ackermann, La Voulte Sur Rhone, all of France

[73] Assignee: Eurecat, France

[21] Appl. No.: 460,863

[22] Filed: Jun. 5, 1995

Related U.S. Application Data

[62] Division of Ser. No. 201,504, Feb. 24, 1994, Pat. No. 5,508,243.

[30] Foreign Application Priority Data

Feb. 26, 1993 [FR] France .................................. 93 02366

[51] Int. Cl.6 .................................................. F26B 19/00
[52] U.S. Cl. .................................. 34/61; 34/147; 34/164; 34/179; 219/388
[58] Field of Search ........................... 34/61, 64, 71, 34/147, 176, 164, 179; 165/DIG. 225, 970, 110 DC, 120; 502/20, 56, 5, 34, 514, 522; 219/388

[56] References Cited

U.S. PATENT DOCUMENTS

| | | | |
|---|---|---|---|
| 4,035,151 | 7/1977 | Czerny et al. | 34/164 |
| 4,048,472 | 9/1977 | Saver et al. | 34/147 |
| 4,255,129 | 3/1981 | Reed et al. | 34/164 |
| 4,399,350 | 8/1983 | Schneider et al. | 219/388 |
| 4,548,623 | 10/1985 | Naske | 34/147 |

*Primary Examiner*—John M. Sollecito
*Assistant Examiner*—Steve Gravini
*Attorney, Agent, or Firm*—Millen, White, Zelano & Branigan, P.C.

[57] ABSTRACT

An apparatus for the treatment of solid particles having a substantially circular metal coil with at least two turns helically would around a vertical axis and a central shaft, a lateral pipe for introducing particles and a lateral pipe for drawing off particles, a low voltage current tapping point for heating a turn of the coil by Joule effect to 20°–1000° C., an assembly of two pipes with a lateral pipe for introducing a fluid and a lateral pipe for drawing off a fluid such that the fluid can flow through at least one turn of the coil and means for imparting vibrations to the shaft and coil to advance the particles.

12 Claims, 3 Drawing Sheets

HEAT TREATMENT OF SOLID CATALYST OR ADSORBENT PARTICLES IN THE PRESENCE OF FLUID IN A VIBRATING HELICAL COIL

This is a division of U.S. patent application Ser. No. 08/201,504 flied Feb. 24, 1994, U.S. Pat. No. 5,508,243.

The present invention relates to a process for the treatment of solid particles consisting of making the said particles rise in at least one vibrating helical coil, subjecting them over most of their path to a temperature profile and contacting them with at least one fluid over at least part of their path. The present invention can apply to solid catalytic and/or adsorbent particles. The invention also relates to the apparatus for performing the process.

The use of a vibrating elevator with a helical ramp is well known in the art for the purpose of raising granular, extruded or pellet products. Such an apparatus also makes it possible to bring about the separation of the granular products on the one hand from larger products rising within the granulated product layer and on the other hand from smaller products coming directly into contact with the ramp.

Such an apparatus can be simultaneously used as a heat exchanger. French patent application 2634187 consequently describes an apparatus having a vibrating helical coil, so that heat exchanges takes place by indirect contact with a heat transfer fluid immersing the turns of the coil or by direct contact with at least one gas flowing within the coil in cocurrent or countercurrent manner with respect to the flow direction of the solid particles.

SUMMARY OF THE INVENTION

The present invention makes it possible to perform the treatment of solid catalytic and/or adsorbent particles rising within at least one substantially tubular, vibrating helical coil, said particles being exposed to a temperature profile over most of their path and said particles being contacted with at least one fluid over at least part of their path. The fluid is preferably a reactive gas in the case of solid catalytic particles.

The process according to the invention is characterized by the heating of at least one pitch or turn of the coil by the Joule effect to a temperature between 20° and 1000° C. The Joule effect directly generates heat in the mass of the coil. It therefore leads to a greater flexibility for the control of the temperature in the core of the coil compared with indirect heating by a heat transfer fluid or direct heating by a reactive or non-reactive gas flowing in the coil.

According to a preferred embodiment of the process of the invention, there is a cooling of the solid particles at the end of the path, i.e. in the upper end of the coil. This cooling takes place by indirect contacting of said end with a heat transfer fluid, which is preferably water.

The contacting of the solid particles with at least one fluid over at least part of the path of said particles can take place successively a great number of times along the path of said particles independently or not of the heating of at least one turn of the coil by the Joule effect in the material of coil. The said fluid flows in cocurrent or countercurrent manner with respect to the flow of the solid particles. Any contacting takes place over at least part of the path, i.e. over at least one turn of the coil. There are preferably 2 to 10 successive contactings along the path of the solid particles and in even more preferred manner 3 to 4 successive contactings along the path.

The process according to the invention comprises the use of at least one substantially tubular, vibrating helical coil. Said metal coil has at least two pitches or turns and can e.g. be obtained by shaping a metal tube in helical form about a substantially vertical axis. A central shaft makes it possible to rigidify and support the helix formed by the coil. The coil is electrically insulated from the central shaft by the fixing system.

A transformer supplies the coil with low voltage current making it possible to directly heat by the Joule effect the metal mass of the tube to a temperature between 20° and 1000° C. The use of such a heating system generally requires numerous electrical tapping points along the coil. The voltage is adequate for giving off the desired power and is generally low for safety reasons e.g. below 50 V.

The vibrations can be produced by at least one system placed at any adequate level, e.g. at the bottom or top of the shaft or placed around the coil. Among the systems which can be used are unbalance motors, electromagnetic vibrating means (excited by a variable cycle with the creation of pulses) and unbalance exciting means. Preferably, the vibrations are produced by a table serving as a support for the central shaft and actuated by two unbalanced motors.

The solid particles transformed by the process according to the invention have a grain size between 0.1 μm (micrometer) and 10 cm and preferably between 1 μm and 1 cm. The particles are preferably balls, extrudates or pellets. They are used for at least one of the following properties: adsorption, catalysis. They are preferably solid catalytic particles.

The apparatus according to the invention comprises:

A tube of at least one coil having at least two turns wound helically about a vertical axis and a central shaft. The tube is made from metal, preferably steel. The coil has a developed length between 0 and 200 m and the height of the helix formed by said coil is generally between 0 and 20 m. The angle of rise of the coil measuring the inclination of the coil with respect to the horizontal is between 1° and 10°, preferably between 1° and 5° and in even more preferred manner between 1° and 4°. The cross-section of the coil is preferably substantially circular and in this case the coil is a tube. The tube generally has a diameter between 10 and 300 mm. In the case of a preferred apparatus according to the invention for which the coil is a tube, the choice of the diameter of said tube is linked with the various other parameters of the system including the hourly mass flow rate, the residence time in the coil of the solid particles and in the case of the preferred vibrating system according to the invention, the power of the unbalanced motors.

At least one lateral pipe for introducing solid particles and opening onto the lower end of the coil and at least one lateral pipe for drawing off said particles opening onto the upper end of the coil.

At least one low voltage current tapping means permitting the heating of at least one turn of the coil by the Joule effect to a temperature between 20° and 1000° C. The efficiency of the heating is measured by the total heat transfer coefficient between the heating tube and the solid particles carried. The coefficient rises when the dimensionless vibration coefficient rises, but the solid particle advance speed also rises for a given motor inclination and therefore the residence time of said particles in the coil decreases. The dimensionless vibration coefficient is defined as the ratio of the vertical component of the vibration to that imposed by gravity.

Therefore the electric power must be carefully chosen taking account of the vibration parameters (inclination of the motors in the case of the preferred vibration system according to the invention) and the tube length. The transfer coefficient is also dependent on the grain size of the solid particles. For example, for a sand of grain size 200 μm (micrometers) with a dimensionless vibration coefficient between 1.2 and 3.5, the transfer coefficient is between 50 and 200 W/m$^{2\circ}$ C.

At least one assembly of two pipes having a lateral pipe for introducing at least one fluid and a lateral pipe for drawing off at least said fluid, so that said fluid flows in at least one turn of the coil. There are preferably 2 to 10, in more preferred manner 3 or 4 such pipes. The fluid flows in cocurrent or countercurrent manner with respect to the flow direction of the solid particles. It is also possible to recover with the lateral drawing off pipe of said assembly of two pipes the gas or gases given off by the heat effect or by a reaction. The speed of a fluid flow (fluid introduced or gas given off) is chosen as a function of the solid particles carried. Account must be taken of said flow because it accelerates or decelerates the particles depending on its flow direction, particularly in the case of small particles. In particular, a countercurrent-flowing fluid stream may block the apparatus. For example, for sand particles with a grain size equal to 1600 μm, the counter-current-flowing gaseous reactive flow rate must be below 2 m/s in order to permit a satisfactory operation of the apparatus.

Means for imparting vibrations to the shaft—coil assembly, such as the dimensionless acceleration constant, which is the ratio of the vertical component of the acceleration to the acceleration due to gravity, is between 0 and 4, preferably between 1.2 and 3.5 and in even more preferred manner between 1 and 3, so that the advance speed of the particles is between 0.05 and 0.5 m/s, preferably between 0.1 and 0.4 m/s and even in more preferred manner between 0.1 and 0.3 m/s and so that the hourly particle mass flow rate is between 1 kg/h and 50 tonnes/h, preferably between 5 kg/h and 10 tonnes/h.

In the case of the preferred embodiment according to the invention, the vibrations are produced by a table serving as a support for the central shaft and actuated by two unbalanced motors. In this case, the solid particles carried within the coil advance at a speed proportional to the dimensionless acceleration constant, for a given inclination of the motors and a given rise angle. The dimensionless acceleration constant is dependent on the spacing of the unbalances and their rotation speed for the given system. For a variation of the constant between 1.2 and 3.5, the advance speed of the particles is typically between 0.1 and 0.3 m/s. Thus, said speed can easily be regulated by acting on the spacing of the unbalances, the inclination of the motors or the rotation speed of the motors. The hourly volume flow rate of the particles is dependent on the dimensionless vibration constant, but also on the diameter of the tube forming the coil. The power of the motors and the overall dimensions within the tube are limiting factors. Thus, a tube of reference DN 40 (1¼") carries a maximum of 700 kg/h of sand with particles having a diameter of 1.6 mm. The inclination of the motors must not generally exceed 35° in order to bring about an efficient advance of the solid particles in the tube without producing excessive vibrations.

It is possible for that part of the path of the solid particles where at least one coil turn is heated to at least partially coincide with the path portion where at least one fluid flows in the coil. However, within the scope of the present invention, it is also possible for said path portions not to coincide.

According to another embodiment of the apparatus there is a contacting of the upper end of the coil, below the drawing off of the solid particles, with a heat transfer fluid in such a way as to cool the particles. Preferably the fluid is water. This cooling system can be that described in French patent 2634187 in the case of a heat exchange by indirect contact with a heat transfer fluid.

The process and apparatus according to the invention can be used for any catalyst transformation involving a treatment of solid catalytic particles in the presence of at least one reactive gas and for any adsorption treatment involving a treatment of solid particles in the presence of at least one fluid. It is possible to use several apparatuses according to the invention in successive manner for a given use without passing outside the scope thereof. Examples of catalyst treatments are stripping, regeneration or oxidation, presulphurization, sulphurization, reduction, chlorination or any combination of these treatments or any other treatment requiring a controlled atmosphere.

The following examples and drawings illustrate the invention without limiting its scope.

Example 1

Figure 1:
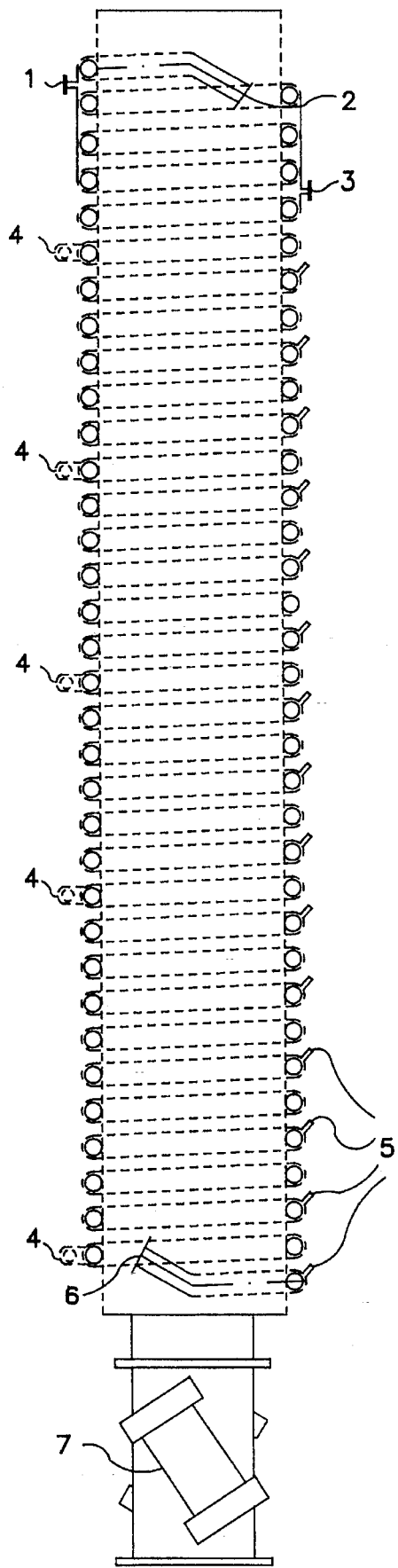
FIG. 1 illustrates the subsequently described example 1 and it relates to a use for stripping a catalyst. The coil is placed on a vibrating table with two unbalanced motors (7). The entry of the solid catalytic particles takes place by the pipe (6) and they exit by the pipe (2). The four last turns or pitches of the coil at the upper end thereof are immersed in a heat transfer fluid constituted by water with a view to cooling the solid catalytic particles before they pass out of the coil. The water enters by the pipe (1) and leaves by the pipe (3). Along the coil are provided numerous low voltage current tapping points (4). The pipes (5) are used as the stripping nitrogen inlets and outlets.
Figure 2:
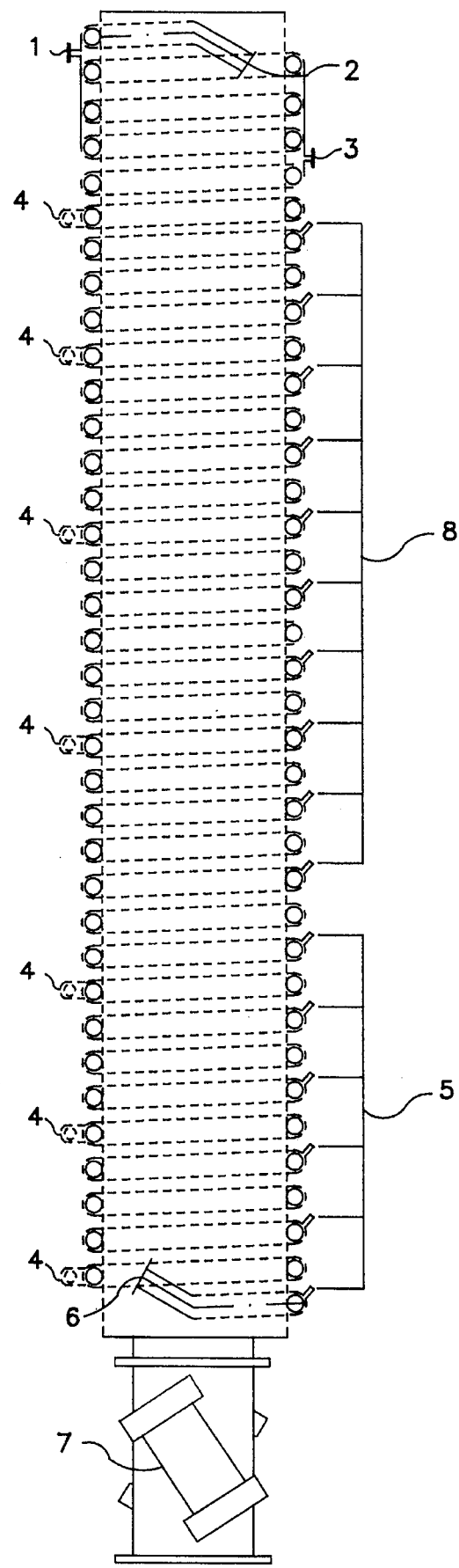
FIG. 2 illustrates the subsequently described example 2 in the case of a stripping and then a regeneration of solid catalytic particles. References (1) to (7) of FIG. 1 appear again in FIG. 2. Regeneration takes place by contacting said particles with air, which exits and enters the coil by means of pipes (8).
Figure 3:
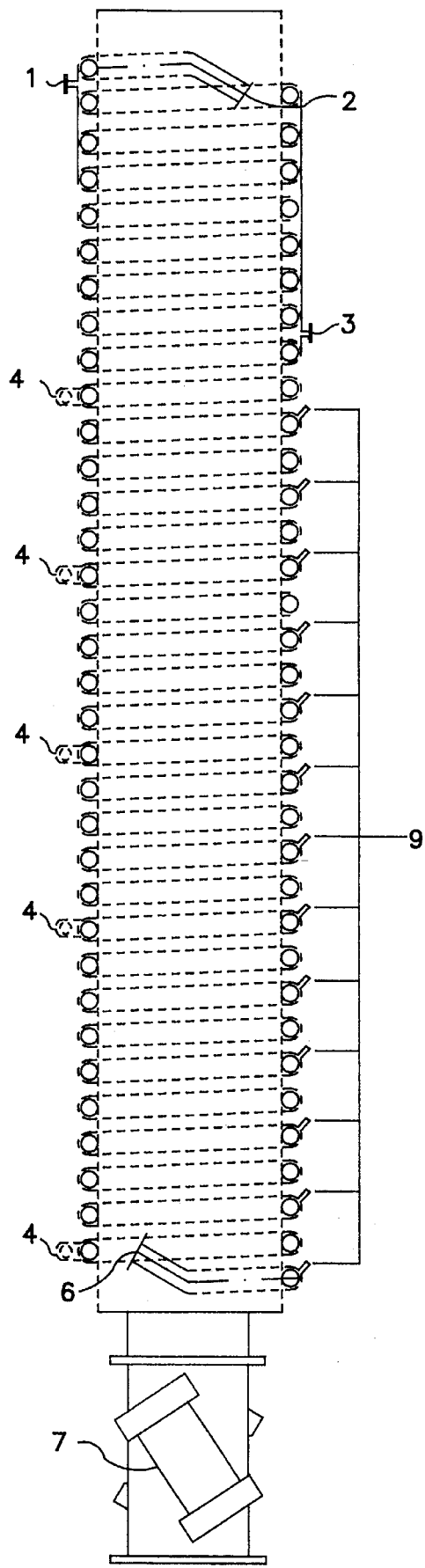
FIG. 3 illustrates examples 4 and 5 described hereinafter in the case of a presulphurization or sulphurization of solid catalytic particles. References (1) to (4), (6) and (7) are also shown in FIGS. 1 and 2. The introduction and removal of gas takes place by the pipes (9).

A hydrocarbon-impregnated hydrotreatment catalyst undergoes a stripping treatment under nitrogen. The catalyst is of the cobalt-molybdenum type deposited on alumina containing:

| Free hydrocarbons measured by extraction with toluene in a | | Inlet | Outlet |
| --- | --- | --- | --- |
| SOXHLET | wt. % | 7.2 | 0.1 |
| Carbon | wt. % | 23.6 | 17.8 |
| Sulphur | wt. % | 6.4 | 7.6 |

The heating apparatus has a temperature rise zone with a residence time of 3 minutes and a coil length of 10 meters, a plateau zone with a residence time of 15 minutes, a coil length of 60 meters and a temperature of 280° C. and a cooling zone with a residence time of 4 minutes and a coil length of 15 meters. The nitrogen flow rate is 30 m³/h and the catalyst flow rate 150 kg/h.

Example 2

The catalyst of example 1 undergoes a stripping and regeneration treatment, which gives the following results:

|  |  | Inlet | Outlet |
|---|---|---|---|
| Hydrocarbons | wt. % | 7.2 | <0.1 |
| Carbon | wt. % | 23.6 | 0.1 |
| Sulphur | wt. % | 6.4 | 0.2 |
| Average length | mm | 2.9 | 2.8 |
| Crushing resistance | mPa | — | 0.95 |
| Specific surface | m²/g | — | 195 |

This treatment is carried out in a solid gas contactor vibrated under the following conditions:

| ZONE | TYPE | TEMPERA-TURE (°C.) | RESIDENCE TIME (minutes) | LENGTH (meters) |
|---|---|---|---|---|
| A | Heating |  | 6 | 15 |
| B | Plateau | 280 | 15 | 40 |
| C | Heating |  | 6 | 15 |
| D | Plateau | 350 | 30 | 80 |
| E | Heating |  | 6 | 15 |
| F | Plateau | 480 | 30 | 80 |
| G | Cooling |  | 10 | 25 |

Zones A and B are under a nitrogen flow (15 m³/h).
Zones C to G are under an air/oxygen flow (300 m³/h).

Example 3 (Comparative)

The same catalyst as that used in example 2 is treated in a conventional stripping and regeneration process consisting of 3 passages into the same rotary furnace of the louvre furnace type, namely a first passage at 280° C. with a nitrogen flow rate of 20 m³/h, a second passage at 350° C. and a third passage at 480° C. with an air flow rate of 1000 m³/h, which gives the following results:

|  |  | Inlet | Outlet |
|---|---|---|---|
| Hydrocarbons | wt. % | 7.2 | <0.1 |
| Carbon | wt. % | 23.6 | 0.1 |
| Sulphur | wt. % | 6.4 | 0.2 |
| Average length | mm | 2.9 | 2.8 |
| Crushing resistance | mPa | — | 0.90 |
| Specific surface | m²/g | — | 185 |

The crushing resistance is lower, so that preference is given to the method described in example 2.

Example 4

A presulphurization takes place by chemisorption of sulphur on a hydrotreatment catalyst of the PROCATALYSE HR 306 type, which is blue, contains 3% CoO and 14% $MoO_3$, the remainder being alumina. 1000 kg of this catalyst are impregnated by a mixture of 187 liters of TPS 37, supplied by ATOCHEM and containing 37% by weight sulphur and 360 liters of white spirit in a rotary drum. The impregnated catalyst is introducedinto a vibrated rotary tubular furnace with a nitrogen flow rate of 10 m³/h and a temperature of 240° C. The solid flow is 40 kg/h and the heating coil length 60 meters, and the degassing cooling coil length is 25 meters. On leaving the catalyst has a dark grey color containing 6.1% sulphur and with an ignition loss at 500° C. of 12.9%.

The thus prepared compound is constituted by molybdenum and cobalt oxides on which the sulphur has reacted, in order to form species related to oxysulphides or oxides supporting chemisorbed sulphur species.

Example 5

The solid catalyst of example 3 undergoes a sulphurization treatment in a vibrating furnace using a hydrogen/nitrogen mixture in a ratio of 95:5, at a flow rate of 5 m³/h, a temperature of 320° C. and a catalyst flow rate of 20 kg/h. The transformation of the oxides or oxysulphides of metals into sulphides takes place according to the following reaction:

$$MoO_3 + 2S + 3H_2 \rightarrow MoS_2 + 3H_2O$$

This gives a black catalyst with a 5.7% sulphur content and an ignition loss of 5.8%.

This catalyst underwent a technical oxygen chemisorption test making it possible to dose the active sites of these sulphide phases for hydrodesulphurization reactions. The Dynamic Oxygen Chemisorption or DOC value is $1.8 \times 10^{-4}$ mole/g of catalyst.

Example 6

This example describes an integrated presulphurization and sulphurization treatment with hydrogen. The catalyst HR 306 is impregnated by TPS 37 according to example 4 and is then treated in a vibrated tubular furnace with dimensions identical to those of example 2 and in accordance with the following conditions:

| ZONE | TYPE | TEMPERA-TURE (°C.) | RESIDENCE TIME (minutes) | LENGTH (meters) | ATMOSPHERE |
|---|---|---|---|---|---|
| A | Heating |  | 6 | 15 | nitrogen |
| B | Plateau | 240 | 30 | 80 | nitrogen |
| C | Heating |  | 6 | 15 | nitrogen hydrogen 95/5 |

| ZONE | TYPE | TEMPERA-TURE (°C.) | RESIDENCE TIME (minutes) | LENGTH (meters) | ATMOSPHERE |
| --- | --- | --- | --- | --- | --- |
| D | Plateau | 320 | 30 | 80 | nitrogen hydrogen 95/5 |
| E | Cooling | | 10 | 25 | nitrogen |

The DOC value is $1.9 \times 10^{-4}$ mole/g catalyst, which is better than that obtained in example 5. Therefore this integrated treatment is better than the sequential treatments of examples 4 and 5.

We claim:

1. Apparatus for the treatmere of solid particles with a size between 0.1 μm and 10 cm, said apparatus comprising:

at least one substantially tubular metal coil having at least two turns helically wound around a vertical axis and a central shaft, said coil having a diameter between 10 and 300 mm, a developed length between 0 and 200 m, the height of the helix formed by said coil being between 0 and 20 m and the angle of rise of the coil on the basis of the of the inclination of the coil with respect to the horizontal is between 1° and 10°, at least one lateral pipe for the introduction of said particles and at least one lateral pipe for drawing off said particles, at least one low voltage currein tapping poim permitting direct generation of heat in the mass of the coil at at least one turn of the coil by the Joule effect to a temperature between 20° and 1000° C., at least one assembly of two pipes having a lateral pipe for the introduction of at least one fluid and a lateral pipe for drawing off at least said fluid in such a way that said fluid flows in at least one turn of the coil, means for imparting vibrations to the shaft and coil, so that the dimensionless acceleration constam is between 0 and 4, the particle advance speed is between 0.05 and 0.5 m/s and the mass hourly particle flow rate is between 1 kg/h and 50 tonnes/h.

2. Apparatus according to claim 1, wherein the means for imparting vibrations to the shaft and coil assembly consist of a vibrating table actuated by two unbalanced motors.

3. Apparatus according to claim 1, wherein the lateral pipe for the introduction of the solid particles opens onto the lower end of the coil and the lateral pipe for drawing off said particles opens onto the upper end of said coil.

4. Apparatus according to claim 1, wherein the upper end of said coil is cooled by contact with a heat transfer fluid.

5. Apparatus according to claim 1, wherein the coil has a substantially circular cross-section.

6. Apparatus according to claim 1, wherein the angle of rise of the coil is between 1° and 5°, the particles have a grain size between 1 μm and 1 cm, the dimensionless acceleration constant is between 1.2 and 3.5, the particle advance speed is between 0.1 and 0.4 m/s, the mass hourly particle flow rate is between 1 kg/h and 10 tonnes/h and the number of said assemblies of two pipes is between 2 and 10.

7. Apparatus according to claim 1, wherein the coil angle of rise is between 1° and 4°, the dimensionless acceleration constant is between 1 and 3, the particle advance speed is between 0.1 and 0.3 m/s and the number of assemblies of two pipes is 3 or 4.

8. Apparatus according to claim 1, wherein said particles are solid catalytic particles and said fluid is a reactive gas.

9. Apparatus according to claim 1, comprising multiple low voltage current tapping points along the length of the coil to be heated by the Joule effect.

10. Apparatus according to claim 1, wherein the voltage of the at least one low voltage current tapping point is below 50 V.

11. Apparatus according to claim 1, wherein the coil is made of steel.

12. Apparatus for the treatment of solid particles, said apparatus comprising:

at least on substantially tubular metal coil having at least two turns helically wound around a vertical axis and a central shaft, at least one lateral pipe for the introduction of said particles and at least one lateral pipe for drawing off said particles, at least one low voltage current tapping point permitting direct generation of heat in the mass of the coil at at least one turn of the coil by the Joule effect to a temperature between 20° and 1000° C., at least one assembly of two pipes having a lateral pipe for the introduction of at least one fluid and a lateral pipe for drawing off at least said fluid in such a way that said fluid flows in at least one turn of the coil, means for imparting vibrations to the shaft and coil, such that the particles are advanced through the coil.

* * * * *